(12) United States Patent
Ishikawa et al.

(10) Patent No.: US 9,908,365 B2
(45) Date of Patent: Mar. 6, 2018

(54) CAP

(71) Applicants: TOYOTA JIDOSHA KABUSHIKI KAISHA, Toyota-shi, Aichi-ken (JP); PACIFIC INDUSTRIAL CO., LTD., Ogaki-shi, Gifu-ken (JP); CENTRAL MOTOR WHEEL CO., LTD., Anjo-shi, Aichi-ken (JP)

(72) Inventors: Tomoyuki Ishikawa, Nisshin (JP); Hirotaka Terai, Toyota (JP); Kenichi Mikamo, Gifu (JP); Kiichiro Kunishima, Anpachi-gun (JP); Hideyo Nehyo, Anjo (JP); Naoki Tanimura, Toyota (JP)

(73) Assignees: TOYOTA JIDOSHA KABUSHIKI KAISHA, Toyota (JP); PACIFIC INDUSTRIAL CO., LTD., Ogaki-shi (JP); CENTRAL MOTOR WHEEL CO., LTD., Anjo-shi (JP)

( * ) Notice: Subject to any disclaimer, the term of this patent is extended or adjusted under 35 U.S.C. 154(b) by 0 days.

(21) Appl. No.: 15/041,748

(22) Filed: Feb. 11, 2016

(65) Prior Publication Data

US 2016/0288564 A1    Oct. 6, 2016

(30) Foreign Application Priority Data

Apr. 1, 2015   (JP) .................................. 2015-075484

(51) Int. Cl.
| | |
|---|---|
| B60B 7/10 | (2006.01) |
| B60B 7/04 | (2006.01) |
| B60B 7/06 | (2006.01) |
| B60B 7/12 | (2006.01) |

(52) U.S. Cl.
CPC .................. *B60B 7/10* (2013.01); *B60B 7/04* (2013.01); *B60B 7/063* (2013.01); *B60B 7/065* (2013.01); *B60B 7/12* (2013.01); *B60B 2360/32* (2013.01); *B60B 2900/115* (2013.01); *B60B 2900/572* (2013.01)

(58) Field of Classification Search
CPC .. B60B 7/10; B60B 7/04; B60B 7/063; B60B 7/065; B60B 7/12; B60B 2900/115; B60B 2360/32; B60B 2900/572
USPC .......................... 301/37.28, 37.31, 37.34, 37
See application file for complete search history.

(56) References Cited

U.S. PATENT DOCUMENTS

| | | | | |
|---|---|---|---|---|
| 2,304,589 | A * | 12/1942 | Nickerson | F16J 10/04 138/143 |
| 6,030,049 | A * | 2/2000 | Russell | B60B 7/04 301/37.375 |
| 6,247,760 | B1 * | 6/2001 | Kinoshita | B60B 7/02 301/37.34 |

(Continued)

FOREIGN PATENT DOCUMENTS

| | | |
|---|---|---|
| JP | S58-1047 Y2 | 1/1983 |
| JP | S59-069002 U | 5/1984 |

(Continued)

*Primary Examiner* — S. Joseph Morano
*Assistant Examiner* — Jean W Charleston
(74) *Attorney, Agent, or Firm* — Oliff PLC

(57) ABSTRACT

A cap has a plurality of engaging portions elastically engageable with a wheel for holding a tire. The cap is configured to partly cover the wheel. Each of the plurality of engaging portions has a spring member formed of metal.

11 Claims, 13 Drawing Sheets

(56) References Cited

U.S. PATENT DOCUMENTS

| | | | |
|---|---|---|---|
| 7,147,289 B2 * | 12/2006 | Nakamura | ............... B60B 7/08 301/37.28 |
| 2012/0133197 A1 | 5/2012 | Mengle et al. | |
| 2012/0256473 A1 | 10/2012 | Schmid et al. | |
| 2014/0167491 A1 * | 6/2014 | Karashima | ............... B60B 7/00 301/37.102 |

FOREIGN PATENT DOCUMENTS

| | | |
|---|---|---|
| JP | S62-000003 U1 | 1/1987 |
| JP | S62-095903 U1 | 6/1987 |
| JP | H05-2321 Y2 | 1/1993 |
| JP | 2009-184386 A | 8/2009 |

* cited by examiner

CAP

CROSS REFERENCE TO RELATED APPLICATION

The present application claims priority from Japanese Patent Application No. 2015-075484, which was filed on Apr. 1, 2015, the disclosure of which is herein incorporated by reference in its entirety.

BACKGROUND

Technical Field

The following disclosure relates to a cap which partly covers a wheel.

Description of the Related Art

Patent Document 1 (Japanese Patent Application Publication No. 2009-184386) discloses a cap for partly covering a wheel. This cap is installed on the wheel by bolts, for example. Patent Document 2 (Japanese Examined Utility Model Registration Application Publication No. 05-2321) and Patent Document 3 (Japanese Examined Utility Model Registration Application Publication No. 58-1047) disclose caps for covering an entirety of a wheel. Each of these caps is installed on the wheel not by bolts but by a plurality of engaging portions provided on the same circumference.

SUMMARY

Accordingly, an aspect of the disclosure relates to improvement of a cap which partly covers a wheel, for example, relates to facilitation of installation of the cap.

In one aspect of the disclosure, a cap partly covers a wheel and includes a metal spring member. Elastic deformation of the spring member facilitates installation of the cap on the wheel. This configuration eliminates the need of bolts or other fastening components, thereby facilitating the installation.

Claimable Inventions

There will be described inventions recognized to be claimable in the present invention and features of the invention.

(1) A cap, comprising
a plurality of engaging portions elastically engageable with a wheel for holding a tire,
wherein the cap is configured to partly cover the wheel, and
wherein each of the plurality of engaging portions comprises a spring member formed of metal.

A metal leaf spring may be used as the spring member, for example.

(2) The cap according to the above form (1), wherein at least two of the plurality of engaging portions are spaced apart from each other in at least one of a circumferential direction and a radial direction of the cap.

The two engaging portions are provided so as to be spaced apart from each other in the circumferential direction or the radial direction, whereby the cap is positioned relative to the wheel in the circumferential direction or the radial direction. Thus, by providing at least three engaging portions, the cap can be positioned relative to the wheel in the circumferential direction and the radial direction.

(3) The cap accordion to the above form (1) or (2), wherein at least two engaging portions of the plurality of engaging portions are spaced apart from each other in a radial direction of the cap,
wherein the cap comprises at least one contact portion,
wherein when a radial force of the wheel which acts on the cap is less than a set value, the at least one contact portion faces a radially facing surface of the wheel in the radial direction and is spaced apart from the radially facing surface, and
wherein when the radial force is greater than or equal to the set value, the at least one contact portion is in contact with the radially facing surface.

When the force of the wheel which acts on the cap in the radial direction is less than the set value, the force is received by the at least two engaging portions provided, so as to be spaced apart from each other in the radial direction. When the force in the radial direction is greater than or equal to the set value, the force is received by the at least two engaging portions and the at least one contact portion. As a result, the maximum value of a force applied to the at least two engaging portions can be made smaller, resulting in longer useful life of the engaging portions.

(4) The cap according to any one of the above forms (1) through (3), wherein each of at least one engaging portion of the plurality of engaging portions comprises at least one hole spring member, each of which is the spring member shaped so as to be engageable with a through hole formed in the wheel.

(5) The cap according to the above form (4), wherein each of the at least one hole spring member comprises: a spring body having a substantially U-shape; and a pair of flanges respectively provided on opening-side opposite end portions of the spring body.

The U-shaped spring body is constituted by a pair of opposed portions which can be moved toward and away from each other. When the pair of opposed portions are moved toward each other, the spring body is compressed and thereby easily passes through the through hole. After the flanges pass through the through hole, the pair of opposed portions are moved away from each other due to resilience thereof. In this state, outer edges of the respective flanges can be located on an outer side of an inner edge of the through hole.

(6) The cap according to the above form (4) or (5), wherein each of the at least one hole spring member is provided so as to be elastically deformable in a substantially radial direction of the wheel.

The substantially radial direction refers to the case where a direction in which elastic deformation is enabled (e.g., a direction in which the pair or opposed portions of the U-shaped spring body can be moved toward and away from each other in the case where the cap includes the U-shaped spring body) substantially coincides with the radial direction.

(7) The cap according to any one of the above forms (4) through (6), wherein each of the at least one engaging portion comprises at least one resin cover that covers at least a portion of a corresponding one of the at least one hole spring member.

In the case where the metal hole spring member is covered with the resin cover, the wheel and the metal hole spring member are not directly brought into contact with each other, for example. This construction makes it difficult for the wheel to rust and to be damaged, for example. The resin cover does not always need to cover the entire spring member.

(8) The cap according to the above form (7), wherein each of the at least one cover comprises a plurality of contact portions each contactable with an inner circumferential wall of the through hole.

The engaging portion is engaged with the wheel such that the engaging portion and the wheel are rotatable relative to each other.

(9) The cap according to the above form (7) or (8), wherein each of the at least one cover comprises an inclined portion provided on an end portion of the hole spring member, and the end portion is inserted first when the hole spring member is inserted into the through hole.

The inclined portion is provided on each of the opening-side end portions of the pair of opposed portions of the U-shaped spring body. The inclined portion may protrude such that its inner portion is located downstream of its outer portion in a direction of the insertion of the hole spring member. The inclined portion facilitates the insertion of the U-shaped spring body into the through hole.

(10) The cap according to any one of the above forms (1) through (9), wherein each of at least one of the plurality of engaging portions comprises at least one step spring member, each of which is the spring member shaped so as to be engageable with a step of the wheel.

The engaging portion including the step spring member and the engaging portion including the hole spring member may be different from each other.

(11) The cap according to the above form (10), wherein each of the at least one step spring member comprises a hook engageable with the step of the wheel.

For example, the step of the wheel may be provided on a radially facing surface which faces in the radial direction and may be provided on a circumferentially facing surface which extends in the radial direction and faces in the circumferential direction.

(12) The cap according to any one of the above forms (1) through (11),
wherein two engaging portions of the plurality of engaging portions are spaced apart from each other in the circumferential direction,
wherein one of the two engaging portions comprises a first side-wall spring member which is the spring member elastically engageable with one of a pair of side walls of a recessed portion of the wheel, and the pair of side walls face each other in the circumferential direction, and
wherein another of the two engaging portions comprises a second side-wall spring member which is the spring member elastically engageable with another of the pair of side walls.

(13) The cap according to the above form (12),
wherein the first side-wall spring member and the second side-wall spring member are curved and respectively comprise openings, and
wherein the first side-wall spring member and the second side-wall spring member are provided in a state in which the openings thereof are opposed to each other.

(14) The cap according to the above form (3),
wherein a clearance is formed between the contact portion and the radially facing surface in the radial direction in the state in which the cap is installed on the wheel, and
wherein a size of the clearance and an elastic modulus of each of the at least two engaging portions are determined such that the contact portion is in contact with the radially facing surface when the radially outward force greater than or equal to the set value acts on the cap.

The elastic modulus is determined mainly by an elastic modulus of the spring member of the engaging portion. The contact portion is located on an inner side of the radially facing surface in the circumferential direction. There is a clearance between the contact portion of the cap and a predetermined portion of the wheel in a state in which the wheel is not rotated, but when rotation of the wheel causes the radially outward force to become greater than or equal to the set value, the contact portion is brought into contact with the predetermined portion.

(15) The cap according to any one of the above forms (1) through (14),
wherein the cap has a substantially fan shape, and
wherein the plurality of engaging portions comprise:
an inner-circumferential-side engaging portion that is one of the plurality of engaging portions which is provided on an inner side of the cap in a radial direction of the wheel in a state in which the cap is installed on the wheel; and
two outer-circumferential-side engaging portions that are two of the plurality of engaging portions, the two outer-circumferential-side engaging portions being provided on an outer side of the inner-circumferential-side engaging portion in the radial direction and spaced apart from each other in a circumferential direction of the wheel.

(16) The cap according to any one of the above forms (1) through (14),
wherein the cap extends substantially in a longitudinal direction of the cap, and
wherein the plurality of engaging portions comprise:
two circumferentially positioning engaging portions that are two of the plurality of engaging portions, the two outer-circumferential-side engaging portions being spaced apart from each other in a circumferential direction of the wheel;
two radially positioning engaging portions that are two of the plurality of engaging portions, the two radially positioning engaging portions being spaced apart from each other in a radial direction of the wheel in a state in which the cap is installed on the wheel.

(17) The cap according to any one of the above forms (1) through (16),
wherein the cap comprises a contact portion, and a clearance is formed between the contact portion and a predetermined portion of the wheel in the radial direction in a state in which the cap is installed on the wheel, and
wherein a size of the clearance and an elastic property of each of at least one of the plurality of engaging portions are determined such that the contact portion is in contact with the predetermined portion when a radially outward force greater than or equal to a set value acts on the cap.

Examples of the elastic property include a spring constant and a set load of the spring member of the engaging portion.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Figure 1:
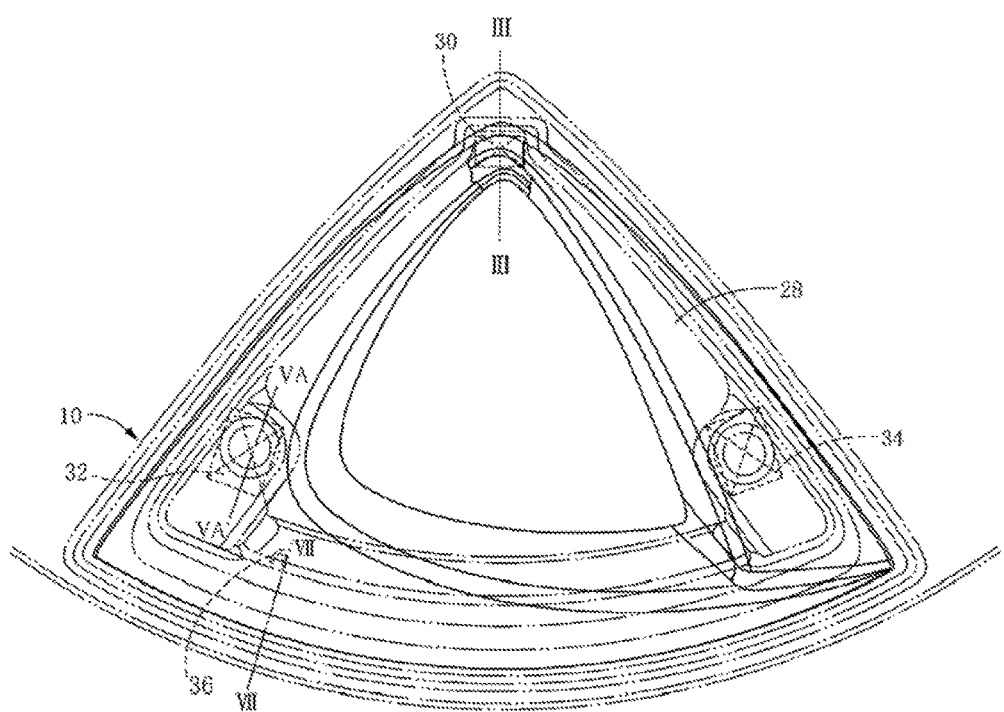
FIG. 1 is a front elevational view of a wheel cap according to a first embodiment.
Figure 2A:
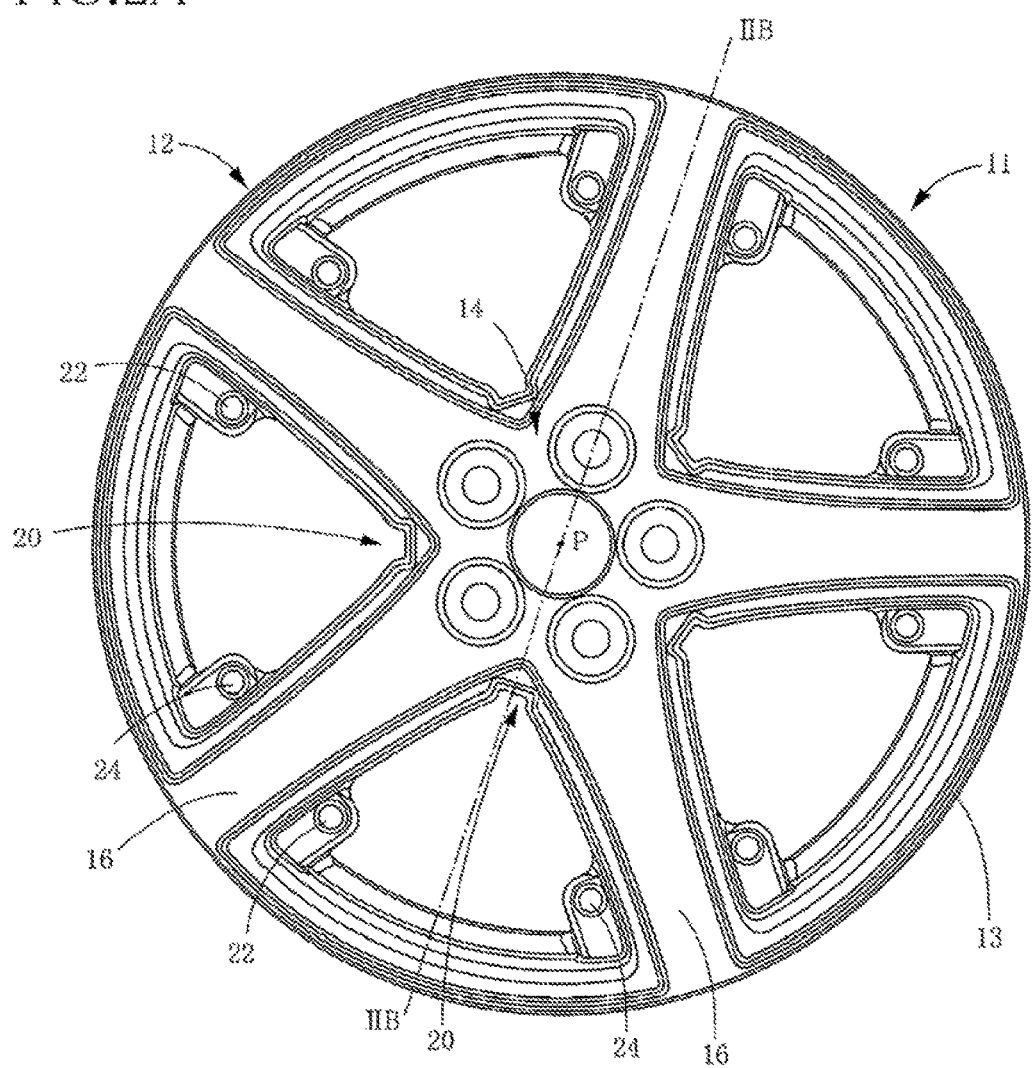
FIG. 2A is a front elevational view of a wheel on which the wheel cap is to be mounted.
Figure 2B:
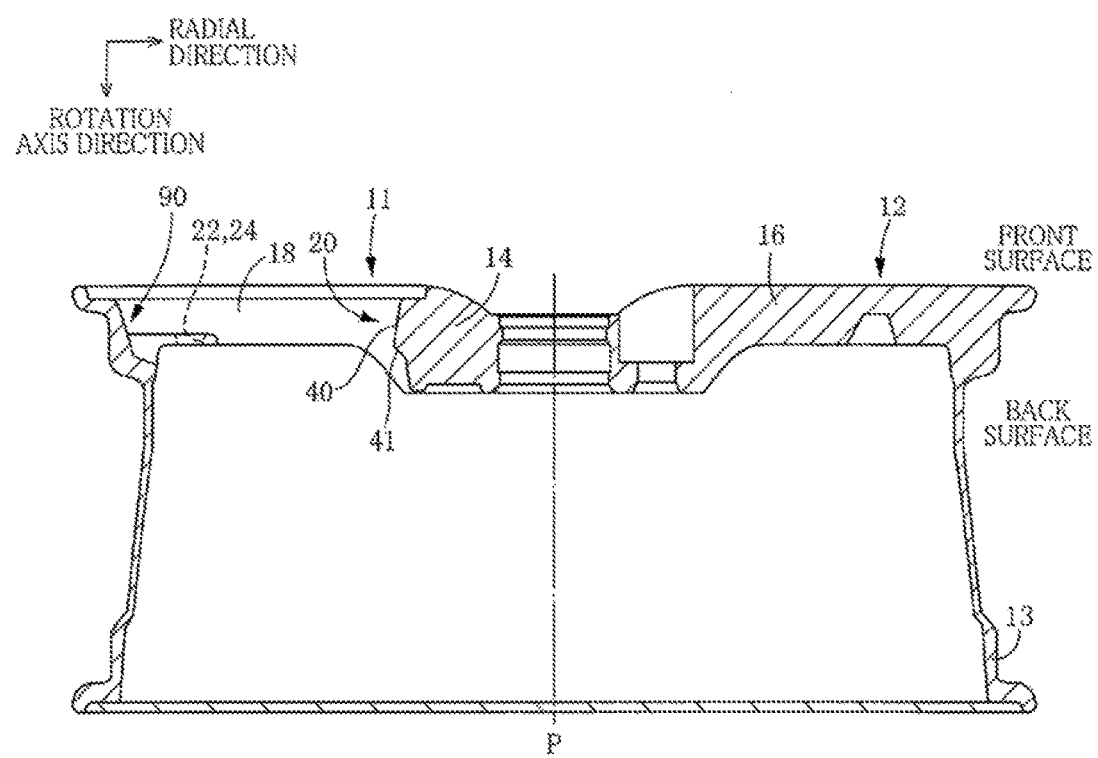
FIG. 2B is a cross-sectional view taken along line IIB-IIB in FIG. 2A.

FIG. 1 illustrates one of caps 10 according to a first embodiment. The caps 10 are to be installed on a wheel 11 illustrated in FIGS. 2A and 2B. The wheel 11 includes a substantially circular disc 12 and a rim 13 provided on an outer circumferential portion of the disc 12. The disc 12 includes: a connector 14 located at a central portion of the disc 12; and a plurality of spokes 16 extending substantially radially. The disc 12 is mounted on, e.g., a hub at the connector 14, and a tire, not shown, is held by the rim 13. A rotation axis P of the wheel 11 passes through the center of the connector 14. As illustrated in FIGS. 2A and 2B, a radial direction of the wheel 11 will be referred to as "radial direction" and a direction parallel with the rotation axis P will be referred to as "rotation axis direction". The radial direction and the rotation axis direction are perpendicular to each other.

An opening 18 is formed between each adjacent two of the spokes 16. Since the spokes 16 are provided radially, each opening 18 has a generally fan shape which is broaden from an inner circumferential, side to an outer circumferential side. An edge of the opening 18 (i.e., a portion of the disc 12 which defines the opening 18) is provided with a step 20 at an inner circumferential end portion of the edge (i.e., an outer circumferential end portion of the connector 14). Through holes 22, 24 are formed through the disc 12 in the rotation axis direction at positions located on an outer circumferential side of the step 20.

In a state in which the wheel 11 is mounted on a vehicle body, and each of the caps 10 is installed on the wheel 11, a surface of each of the cap 10 and the wheel 11 which is located on an outer side of a vehicle a surface viewable from outside of the vehicle) will be referred to as "front surface", and a surface of each of the cap 10 and the wheel 11 which is located on an inner side of the vehicle will be referred to as "back surface". Also, an outer side of the cap 10 and the wheel 11 in the rotation axis direction will be referred to as "front side", and an inner side of the cap 10 and the wheel 11 in the rotation axis direction will be referred to as "back side".

As illustrated in FIG. 1, each of the caps 10 includes a cap body 28 formed of resin and having a generally fan shape. The cap body 28 is shaped like a frame having an opening at its central portion. A rib 36 as a contact portion and three engaging portions 30, 32, 34 are provided on a back surface of the cap body 28 so as to protrude in the rotation axis direction. The engaging portion 30 is provided at a top portion of a fan shape formed on the inner circumferential side. The two engaging portions 32, 34 are provided, on an outer circumferential side of the engaging portion 30, at broaden portions of the fan shape so as to be spaced apart from each other in a circumferential direction. The rib 36 is provided on an outer circumferential side of the engaging portions 32, 34. The engaging portion 30 is engageable with the step 20 of the wheel 11, and the engaging portions 32, 34 are engageable with the respective through holes 22, 24. It is noted that the engaging portion 30 is one example of an inner-circumferential-side engaging portion, and each of the engaging portions 32, 34 is one example of an outer-circumferential-side engaging portion.

Inner-Circumferential-Side Engaging Portion

Figure 3:
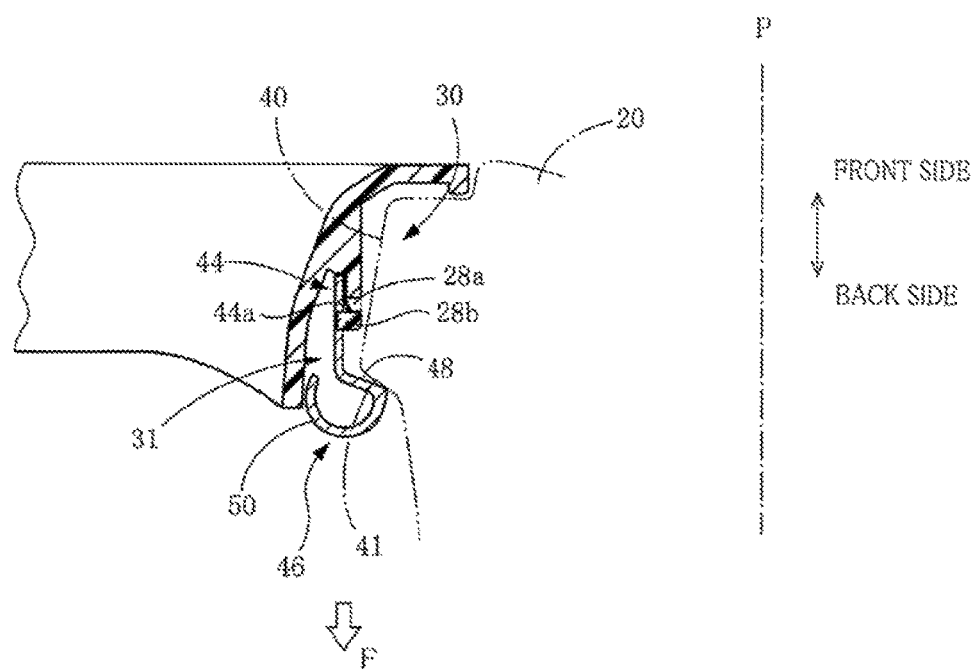
FIG. 3 is a cross-sectional view taken along line III-III in FIG. 1.

As illustrated in FIGS. 2B and 3, the step 20 of the wheel 11 has a surface along the circumferential direction, in other words, a radially outward facing surface facing outward in the radial direction. This radially outward facing surface includes: a first inclined surface 40 inclined so as to be farther from the rotation axis P at its back portion than at its front portion; and a second inclined surface 41 inclined so as to be nearer to the rotation axis P at its back portion than at its front portion.

Figure 4A:
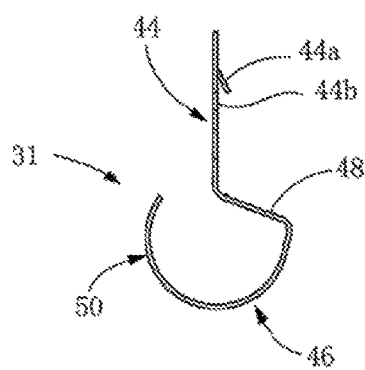
FIG. 4A is a front elevational view of a leaf spring provided on the wheel cap.
Figure 4B:
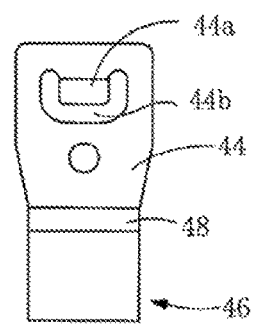
FIG. 4B is a side view illustrating of the leaf spring.

As illustrated in FIGS. 3, 4A, and 4B, the engaging portion 30 of the cap 10 includes a leaf spring 31, as one example of a spring member, which is formed of a plate of metal such as stainless steel. The leaf spring 31 has a holder 44 and a hook 46. The holder 44 is to be mounted on the cap body 28 and has (i) an engaging protruding portion 44a engageable with the cap body 28 and (ii) an engaging recessed portion 44b. The hook 46 has a flat portion 48 and a curved portion 50. The flat portion 48 has an inclined surface inclined with respect to the holder 44. An angle of the inclined surface with respect to the holder 44 is greater than or equal to 90 degrees and less than 180 degrees. The curved portion 50 is connected at its one end to one end portion of the flat portion 48 and curved in an arc shape, and the other end of the curved portion 50 is a free end. Elastic deformation property of the hook 46 is made appropriate by the curved portion 50.

The engaging protruding portion 44a of the holder 44 is engaged with an engaging recessed portion 28a of the cap body 28, and the engaging messed portion 44b of the holder 44 is engaged with an engaging protruding portion 28b of the cap body 28, whereby the leaf spring 31 is held by the cap body 28. The cap both 28 is pressed in the rotation axis direction, whereby the hook 46 of the leaf spring 31 is engaged with the second inclined surface 41. The hook 46 is in an elastically deformed state, and the flat portion 4 is pressed against the second inclined surface 41. This pressing generates a force in the rotation axis direction with effect of the inclined surface, so that a pulling force F is applied to the leaf spring 31, i.e., the engaging portion 30. It is noted that the leaf spring 31 applies an urging force to the cap 10 outwardly in the radial direction.

Outer-Circumferential-Side Engaging Portion

As illustrated in FIG. 2A, each of the through holes 22, 24 of the wheel 11 has a substantially round shape. As illustrated in FIGS. 5A-6B, each of the engaging portions 32, 34 of the cap 10 includes: a metal leaf spring 60 having a generally U-shape; and a resin cover 62 for covering an outer surface of the leaf spring 60. The leaf spring 60 includes a pair of opposed portions 64, 64 and a connector 65 that connects the opposed portions 64, 64 to each other. The opposed portions 64, 64 have end portions near the connector 65 and end portions far from the connector 65 (near an opening). The end portions far from the connector 65 are bent outward and respectively provided with a pair of flanges 66, 66. The pair of flanges 66, 66 include a pair of intermediate flanges 67m, 67m and two pairs of end flanges 67e, 67e. Specifically, each of the flanges 66, 66 includes: the intermediate flange 67m at its intermediate portion; and the two end flanges 67e located on opposite sides of the intermediate flange 67m. Each of the pair of opposed portions 64, 64 may have a hole for reduced weight, but this construction is not essential.

The cover 62 is for covering the outer surface of the leaf spring 60. The cover 62 includes: a pair of cover bodies 68, 68 for covering outer surfaces of the respective opposed portions 64, 64; and a pair of distal end covers 70, 70 for covering outer surfaces of the respective flanges 66, 66. The cover bodies 68, 68 are broaden outward from the front side toward the back side, in other words, each of the cover bodies 68, 68 is inclined outward from the connector 65 toward a corresponding one of the flanges 66, 66. The pair of cover bodies 68, 68 respectively have outer surfaces 72, 72, each of which is an outwardly inclined surface that is inclined outward from the front side toward the back side (i.e., from the connector 65 to the flange 66) so as to protrude outward. The pair of distal end covers 70, 70 protrude backward from distal ends of the respective intermediate flanges 67m, 67m. These protruding portions of the pair of distal end covers 70, 70 respectively have outer surfaces 74, 74, each of which is an inwardly inclined surface. The outer surfaces 74, 74 are inclined such that a distance therebetween decreases with increase in distance from the distal ends of the respective intermediate flanges 67m, 67m (i.e., from the front side toward the back side). The cover 62 prevents contact between the leaf spring 60 and the wheel 11. The cover 62 can prevent oxidation of the leaf spring 60 and the wheel 11 and reduce damages to the wheel 11, for example. It is noted that the leaf spring 60 is fitted and held in the cover 62, and the cover 62 is secured to the back surface of the cap body 28.

The cap body 28 is pressed in the rotation axis direction from the front side toward the back side, whereby the engaging portions 32, 34 are fitted into the respective through holes 22, 24. The pair of inwardly inclined surfaces 74, 74 of the cover 62 are inserted along inner circumferential surfaces of the respective through holes 22, 24, whereby the pair of opposed portions 64, 64 of the leaf spring 60 are moved closer to each other, so that the leaf spring 60 is compressed. The inwardly inclined surfaces 74, 74 of the cover 62 are provided on an end portion of each of the engaging portions 32, 34, which end portion is inserted first. This construction makes it easy to insert each of the engaging portions 32, 34 into the corresponding one of the through holes 22, 24.

Figure 5A:
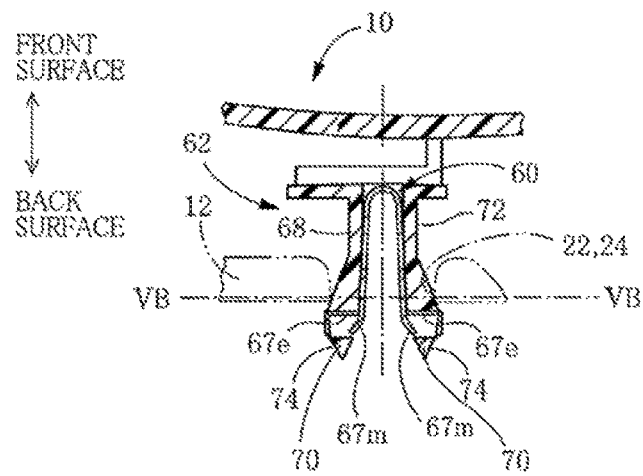
FIG. 5A is a cross-sectional view taken along line VA-VA in FIG. 1.
Figure 5B:
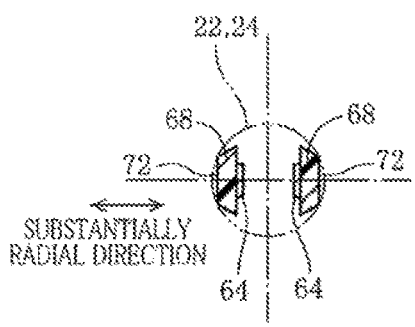
FIG. 5B is a cross-sectional view taken along line VB-VB in FIG. 5A.
Figure 6A:
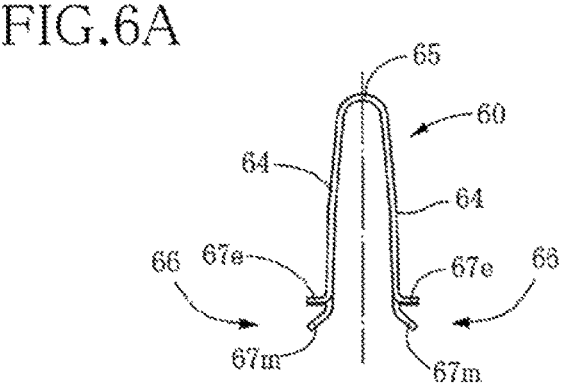
FIG. 6A is a front elevational view of a leaf spring of an engaging portion provided on the wheel cap.
Figure 6B:
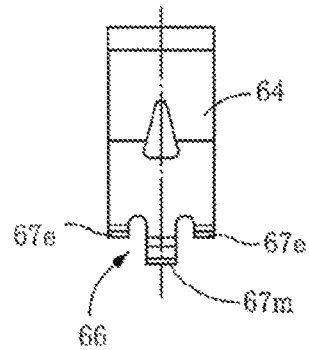
FIG. 6B is a side view of the leaf spring.

When the pair of flanges 66, 66 reach the back surface of the wheel 11 through the respective through holes 22, 24 (that is, when the most outwardly protruding portions of the respective cover bodies 68, 68 of the cover 62 reach the back surface), the distance between the pair of opposed portions 64, 64 is increased by resilience. In this state, an outer edge of each of the end flanges 67e, 67e is located on an outer side of the inner circumferential surface of the corresponding one of the respective through holes 22, 24. As illustrated in FIG. 5B, when an edge of each of the outer surfaces 72, 72 of the respective cover bodies 68, 68 is brought into contact with the inner circumferential surface of the corresponding one of the respective through holes 22, 24, the engaging portions 32, 34 are positioned relative to the respective through holes 22, 24. It is noted that the pair of opposed portions 64, 64 of each of the engaging portions 32, 34 are opposed to each other substantially in the radial direction in the state in which the cap 10 is installed on the wheel 11. As a result, a force acting on the cap 10 in the radial direction is received by the engaging portions 32, 34 and the inner circumferential surfaces of the respective through holes 22, 24 formed in the wheel 11.

Figure 7:
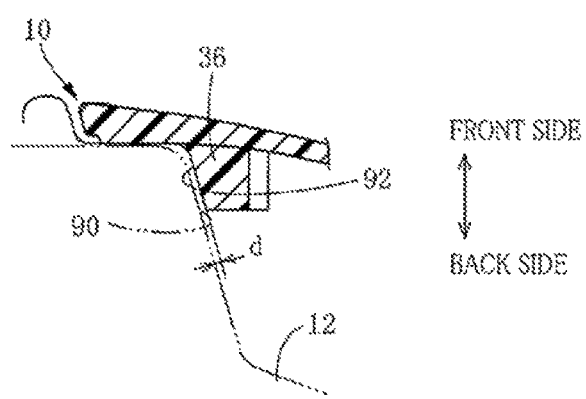
FIG. 7 is a cross-sectional view taken along line VII-VII in FIG. 1.

As illustrated in FIGS. 2B and 7, an outer circumferential portion of the wheel 11 has a surface along the circumferential direction, namely, an inwardly facing surface 90 (which may be referred to as "step") facing inward in the radial direction. As illustrated in FIG. 1, the rib 36 protrudes from the back surface of the cap body 28 in the rotation axis direction. The rib 36 is shaped in cross section like a groove having an opening on its outer circumferential side. In the state in which the cap 10 is installed on the wheel 11, as illustrated in FIG. 7, a circumferentially outer end portion 92 of the rib 36 faces the inwardly facing surface 90 of the wheel 11, with a clearance d therebetween. The size of the clearance d is determined such that the clearance d disappears when a force acting on the cap 10 in the radial direction is greater than or equal to a set value Fth, and the cap 10 is moved in the radial direction. That is, the size of the clearance d is determined such that the rib 36 can be brought into contact with the inwardly facing surface 74.

Figure 9:
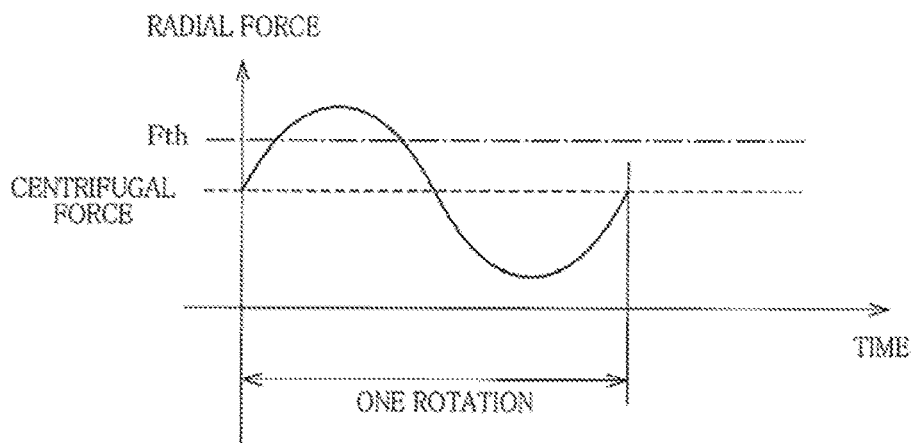
FIG. 9 is a view illustrating a change in radial force acting on the wheel.

During rotation of the wheel 11, each cap 10 receives a centrifugal force and gravity in the radial direction. The centrifugal force is an outward force in the radial direction and determined by a rotational speed of the wheel 11. The magnitude of the centrifugal force is constant when the rotational speed is constant. Since the gravity acts in the vertical direction, a component of the gravity in the radial direction changes with change in rotation of the wheel 11. Thus, the force acting on the cap 10 in the radial direction periodically changes with rotation of the wheel 11 as illustrated in FIG. 9. When the force acting on the cap 10 in the radial direction exceeds the set value Fth, as described above, the rib 36 is brought into contact with the inwardly facing surface 74 of the wheel 11, so that a force in the radial direction is received by the rib 36 and the wheel 11. Each of the engaging portions 32, 34 does not receive a force greater than the set value Fth, that is, each of the engaging portions 32, 34 receives a smaller force.

Installation

Figure 8:
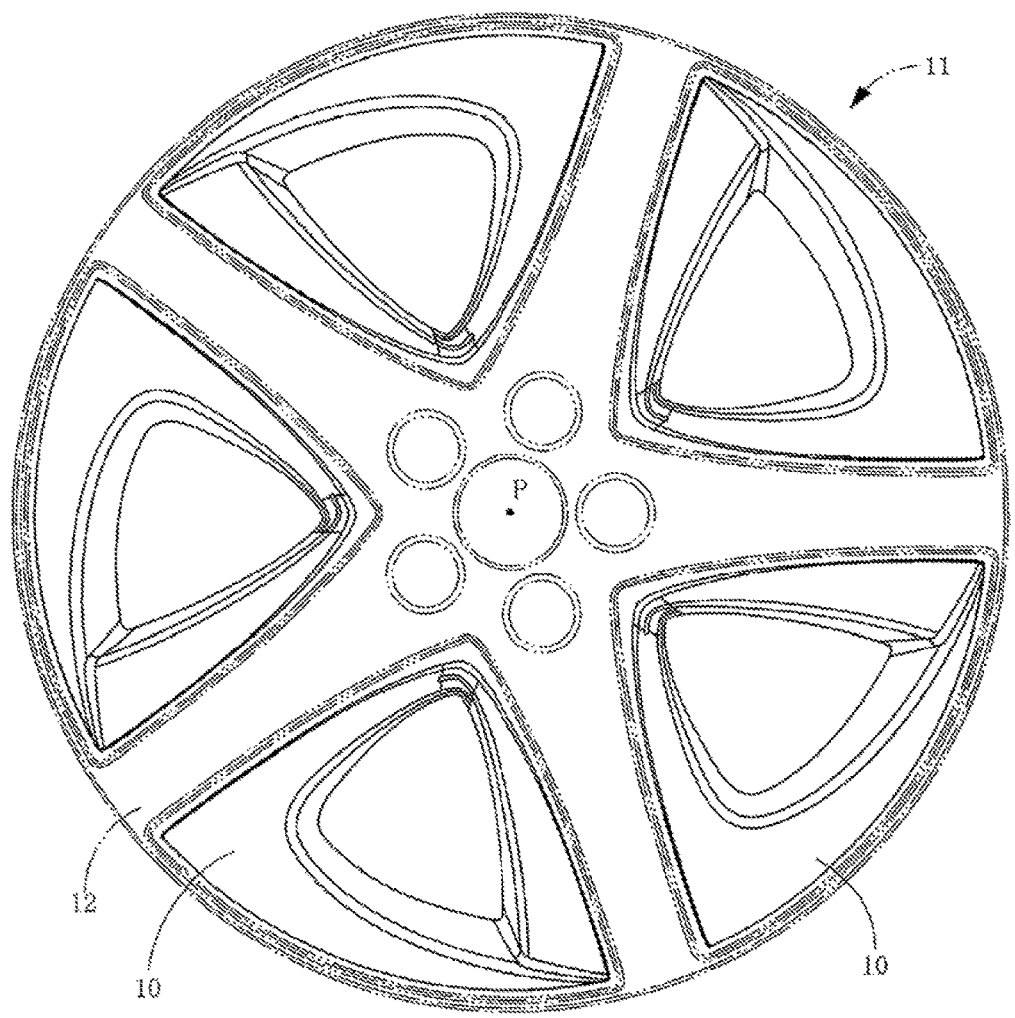
FIG. 8 is a view illustrating a state in which the wheel cap is mounted on the wheel.

In the present embodiment, the cap 10 is pressed against the wheel 11 in the rotation axis direction, which engages the engaging portion 30 with the step 20 and engages the engaging portions 32, 34 with the respective through holes 22, 24. As a result, as illustrated in FIG. 8, the five caps 10 are installed on the wheel 11. Each cap 10 is positioned with respect to the wheel 11 in the circumferential direction by the engaging portions 32, 34 and positioned with respect to the wheel 11 in the radial direction by the engaging portions 32, 34 and the engaging portion 30. Specifically, the engaging portions 32, 34 allow the cap 10 to be rotated relative to the wheel 11, but the cap 10 is positioned in the circumferential direction by the two engaging portions 32, 34 because the two engaging portions 32, 34 are spaced apart from each other in the circumferential direction. On the other hand, since the engaging portion 30 is brought into contact with the radially outward facing surface including the first inclined surface 40 and the second inclined surface 41, the cap 10 is positioned in the radial direction by the engaging portion 30 and at least one of the engaging portions 32, 34.

In view of the above, the three engaging portions 30, 32, 34 enable automatic positioning (centering) of the caps 10 with respect to the wheel 11 without using jigs. Also, when the force acting on the cap 10 in the radial direction becomes greater than or equal to the set value Fth, the rib 36 is brought into contact with the wheel 11 and thereby receives the force in the radial direction. As a result, the forces acting on the engaging portions 32, 34 are reduced, resulting in improved durability of the engaging portions 32, 34. Also, since the cover 62 is provided for the leaf spring 60, it is possible to prevent oxidation of the leaf spring 60 well and reduce damages to the wheel 11.

In the case where a cap covers the entire wheel (the entire disc 12), a centrifugal force is balanced in the cap. Also, since the center of gravity of the cap is located on the rotation axis P, the gravity acts on a rotation center. Accordingly, a force in the radial direction is not problematic for the cap. In the case where the cap partly covers the wheel, however, the force in the radial direction acts on the cap. In the cap 10 according to the present embodiment, in contrast, the force in the radial direction is received by the engaging portions 32, 34, and when the force in the radial direction exceeds the set value Fth, the force in the radial direction is received by the rib 36. This configuration can reduce the forces received by the engaging portions 32, 34.

In the present embodiment, each of the leaf spring 31 and the leaf spring 60 are one example of a spring member. The leaf spring 31 is one example of a step spring member, and the leaf spring 60 is one example of a hole spring member. The pair of opposed portions 64, 64 and the connector 65 constitute a spring member body.

Second Embodiment

Figure 10A:
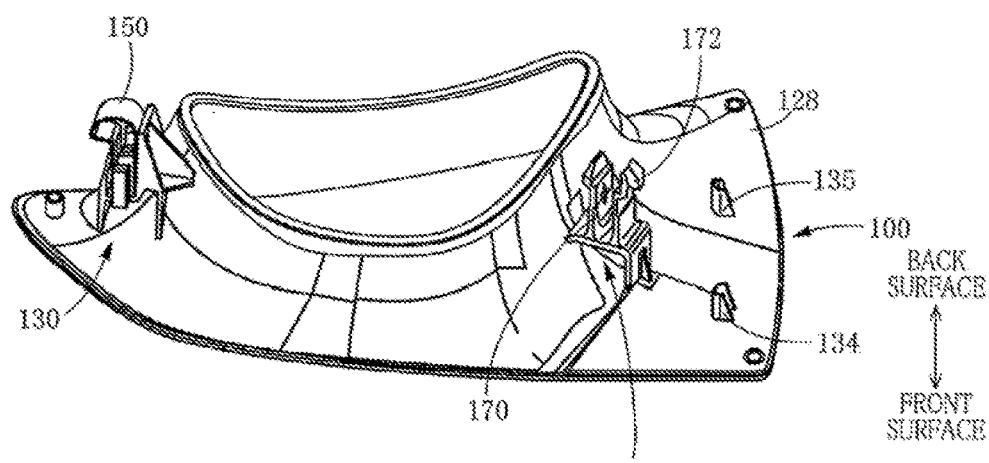
FIG. 10A is a perspective view of a wheel cap according to as second embodiment.
Figure 10B:
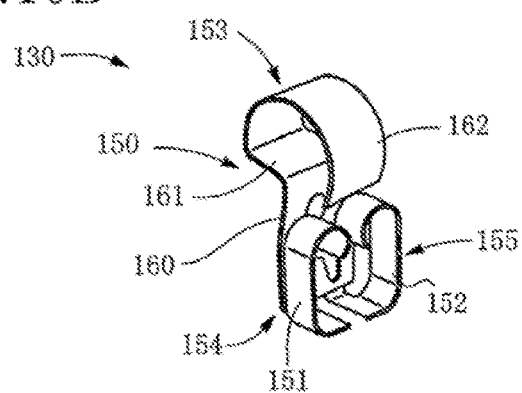
FIG. 10B is a perspective view of a leaf spring of an engaging portion provided on the wheel cap.

FIG. 10A illustrates one of caps 100 according to a second embodiment. The caps 100 are installed on a wheel 102 illustrated in FIGS. 11A and 11B. The wheel 102 includes a disc 103 and a rim 104. The disc 103 includes a connector 105 and a plurality of spokes 106. Partitions 109 are provided each between adjacent two of the spokes 106, so that an opening between the adjacent spokes 106 is divided into two openings 110, 111. The cap 100 is installed so as to cover a peripheral portion of the opening 110 formed between the spoke 106 and the partition 109.

The opening 110 is shaped like a hole elongated substantially in the radial direction. The peripheral portion of the opening 110 of the disc 103 has inner and outer edge portions in the radial direction. The inner edge portion has a recessed portion 112 having an opening at its outer portion in the radial direction. The outer edge portion has a through hole 114 and step 116.

Figure 12:
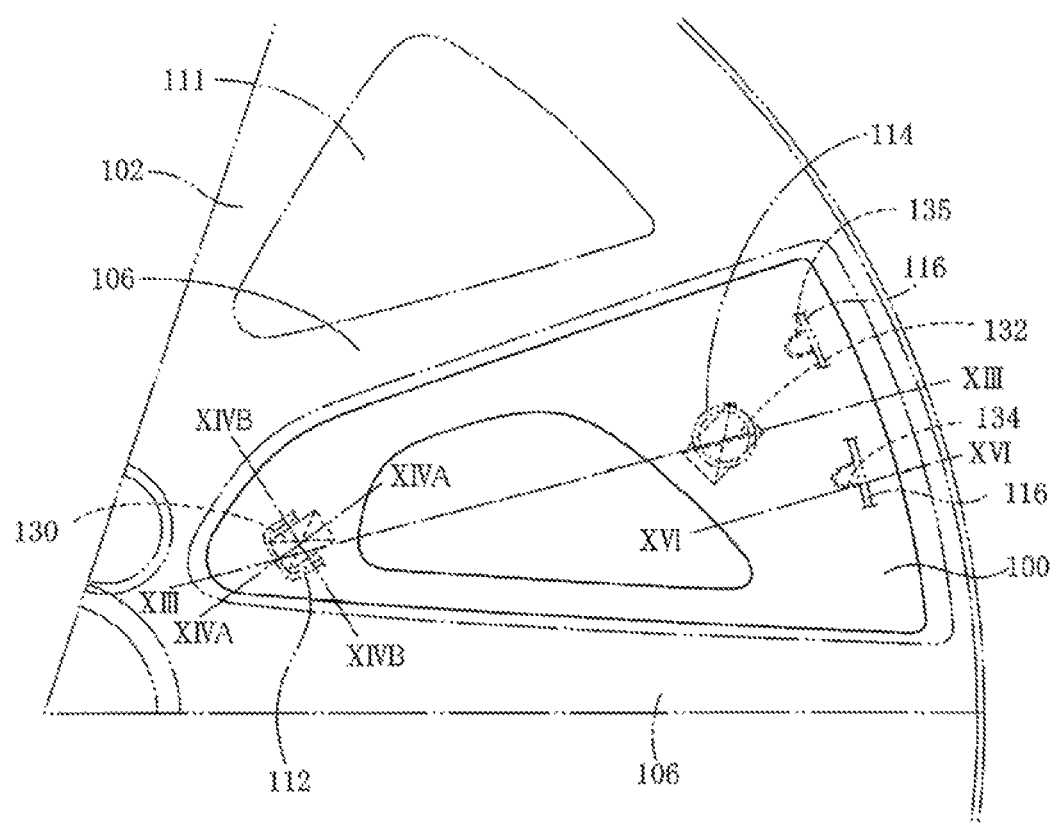
FIG. 12 is a view illustrating as state in which the wheel cap is mounted on the wheel.

The cap 100 has a resin body 128 that is shaped like a generally rectangular frame as illustrated in FIGS. 10A and 12. A back surface of the cap body 128 is provided with an engaging portion group 130, an engaging portion 132, and two ribs 134, 135 which protrude in the rotation axis direction. The engaging portion 132 is located on an outer side of the engaging portion group 130 in the radial direction. The engaging portion group 130 is engaged with the recessed portion 112 of the wheel 102, and the engaging portion 132 is engaged with the through hole 114, whereby the cap 100 is installed on the wheel 102. In the present embodiment, the five caps 100 are installed on the wheel 102.

Circumferentially Inner Engaging Portion

As illustrated in FIGS. 11A, 11B, 14A, and 14B, the recessed portion 112 of the wheel 102 includes: a radially outward facing surface 141 facing outward in the radial direction; and circumferentially facing surfaces 142, 143 which are a pair of side walls located on opposite sides of the radially outward facing surface 141 so as to face each other in the circumferential direction. The radially outward facing surface 141 has a shape similar to that of the radially outward facing surface in the first embodiment. The radially outward facing surface 141 includes: a first inclined surface 145 inclined so as to be farther from the rotation axis P at its back portion than at its front portion; and a second inclined surface 146 inclined so as to be nearer to the rotation axis P at its back portion than at its front portion.

As illustrated in FIGS. 10B and 14A-15B, the engaging portion group 130 of the cap 10 includes three engaging portions 153, 154, 155 respectively including leaf springs 150, 151, 152. The leaf spring 150 is provided so as to be elastically deformable mainly in the radial direction. Each of the two leaf springs 151, 152 is provided so as to be elastically deformable in the circumferential direction. The leaf spring 150 has a shape similar to that of the leaf spring 31 in the first embodiment and includes a holder 160 and a hook 163. The hook 163 includes a flat portion 161 and a curved portion 162. The leaf springs 151, 152 are curved so as to be symmetric. The leaf springs 151, 152 have inner and outer portions. The inner portions, each having an opening, are opposed to each other. The outer portions of the leaf springs 151, 152 are respectively opposed to the pair of circumferentially facing surfaces 142, 143. It is noted that the leaf springs 151, 152 and the leaf spring 150 are connected to each other and formed in one piece. The three leaf springs 150, 151, 152 are covered with a resin cover. The outer portions of the respective leaf springs 151, 152 are respectively engaged with the pair of circumferentially facing surfaces 142, 143 via the cover, whereby the cap 100 is positioned in the circumferential direction.

Circumferentially Outer Engaging Portion

Figure 11A:
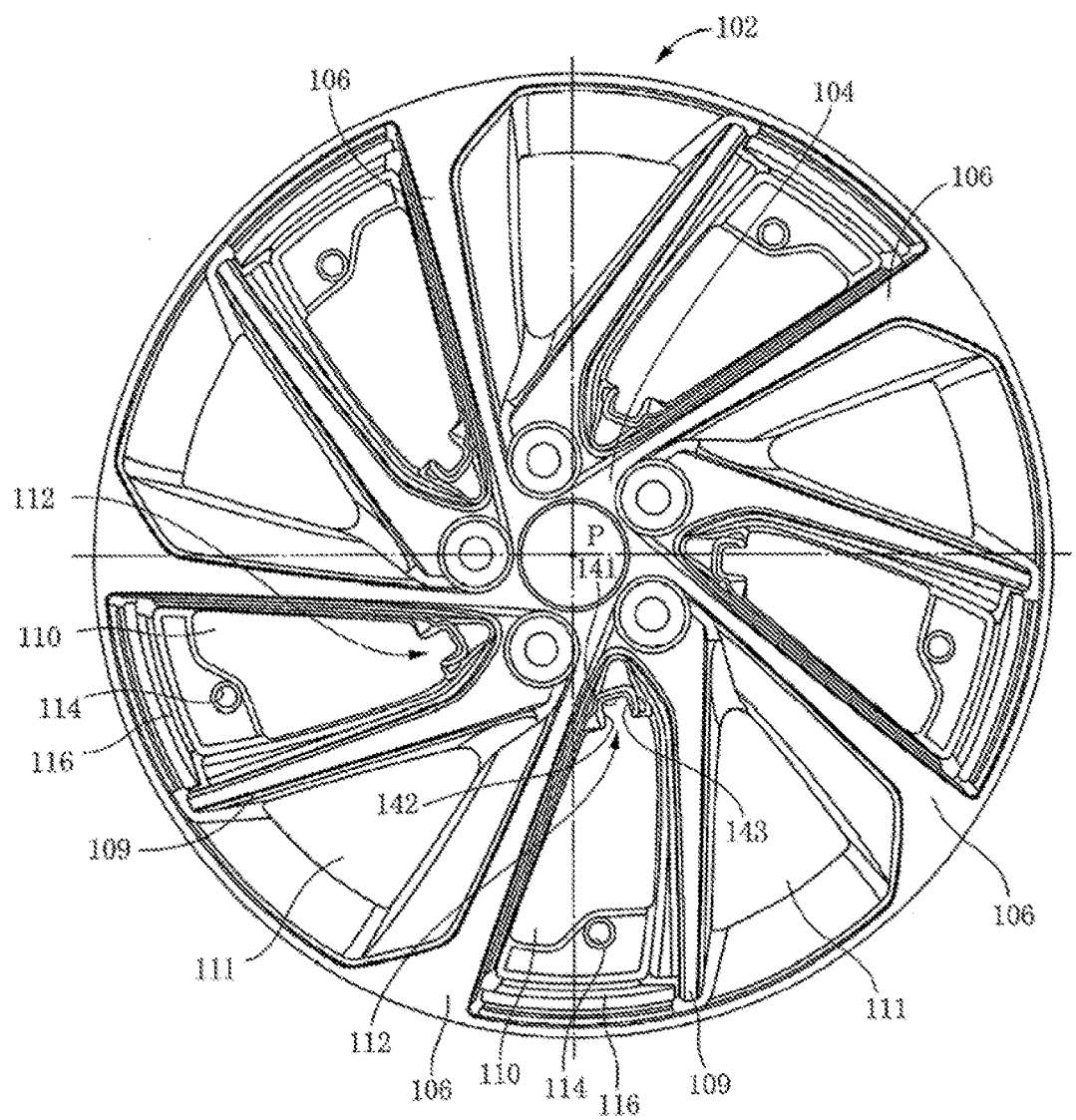
FIG. 11A is a front elevational view of a wheel on which the wheel cap is to be mounted.
Figure 11B:
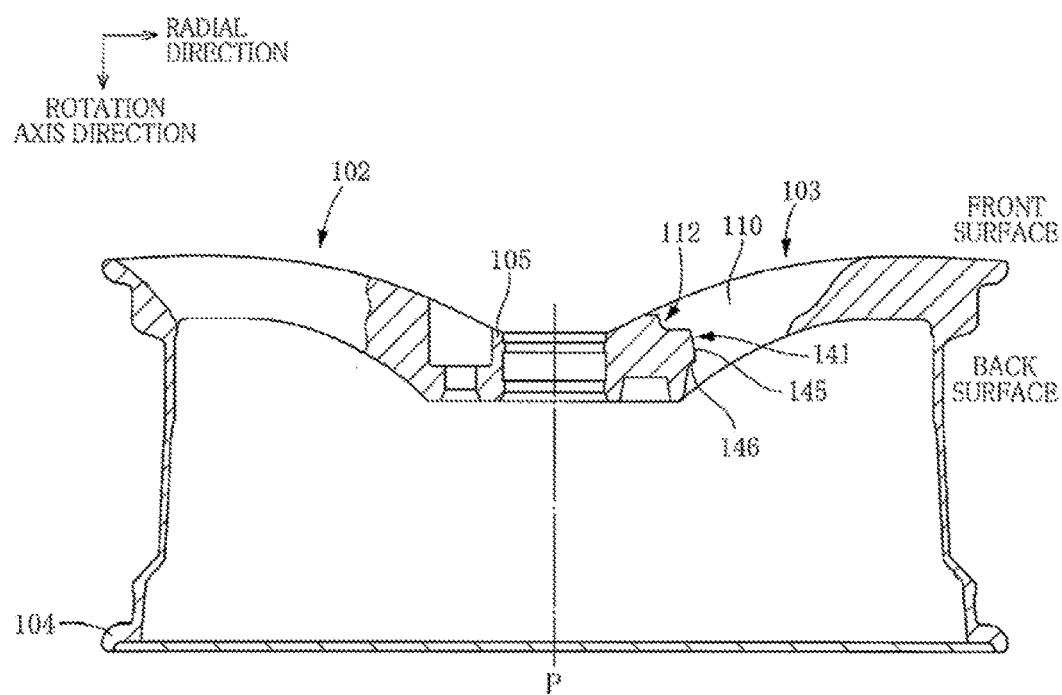
FIG. 11B is a cross-sectional view of the wheel.
Figure 13:
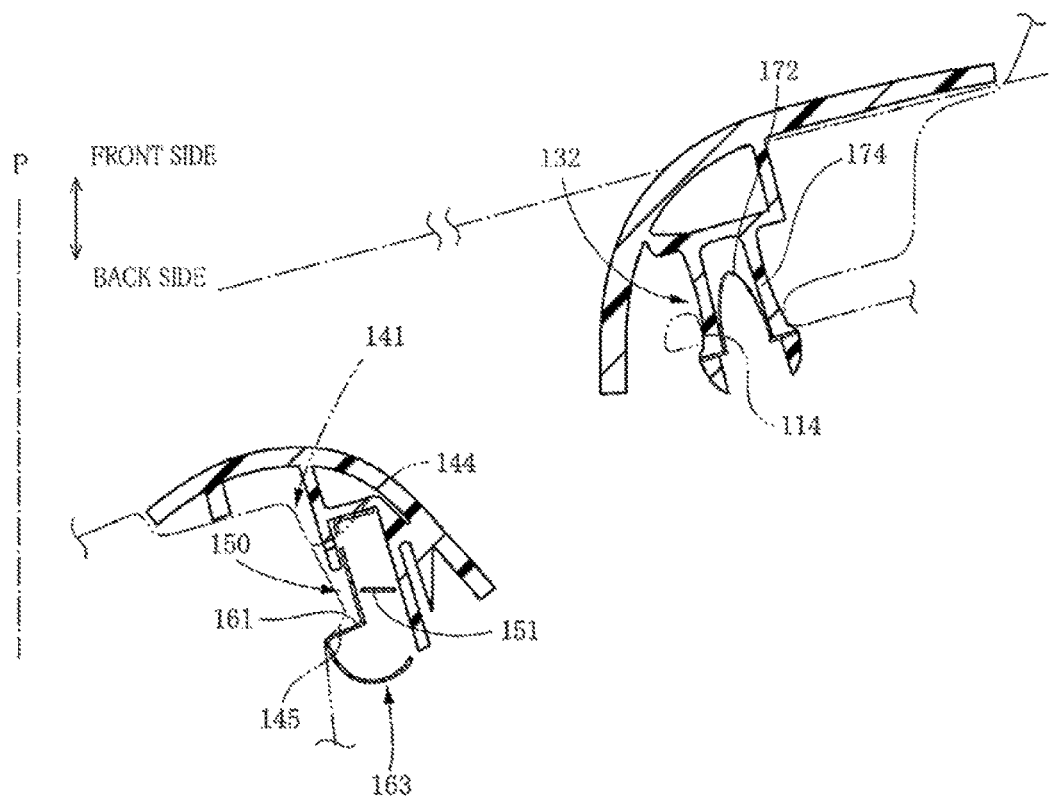
FIG. 13 is a cross-sectional view taken along line XIII-XIII in FIG. 12.
Figure 14A:
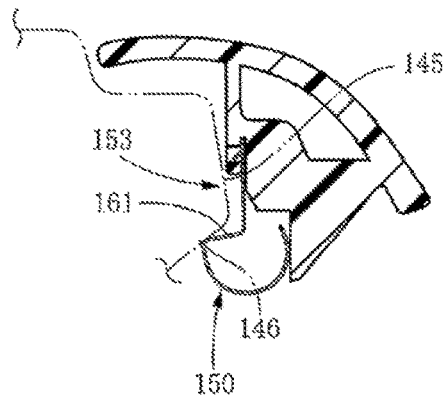
FIG. 14A is a cross-sectional view taken along line XIVA-XIVA in FIG. 12.
Figure 14B:
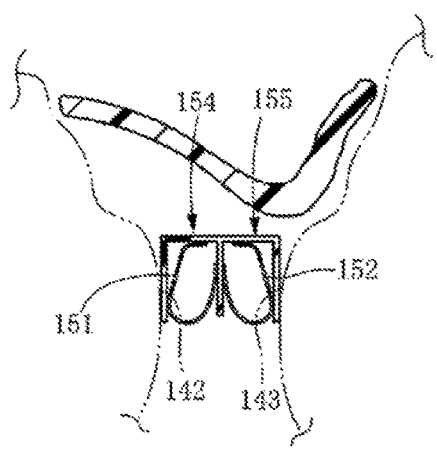
FIG. 14B is a cross-sectional view taken along line XIVB-XIVB.
Figure 15A:
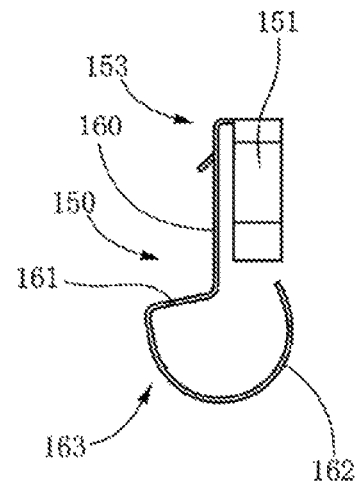
FIG. 15A is a front elevational view of a leaf spring of an engaging portion provided on the wheel cap.
Figure 15B:
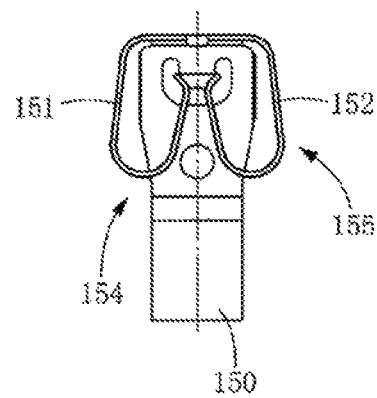
FIG. 15B is a side view of the leaf spring.
Figure 17A:
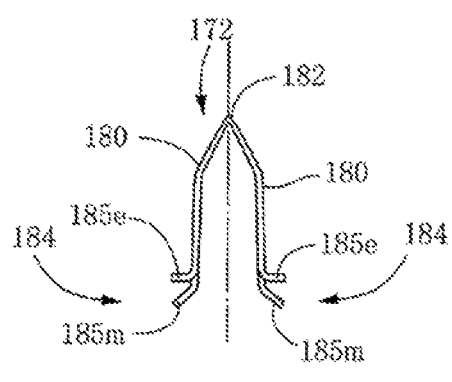
FIG. 17A is a front elevational view of a leaf spring of an engaging portion provided on the wheel cap.
Figure 17B:
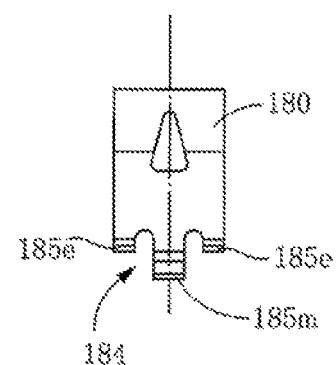
FIG. 17B is a side view of the leaf spring.

As illustrated in FIG. 11A, the through hole 114 of the wheel 102 has a substantially round shape. The engaging portion 132 of the cap 100 has a shape similar to that of the engaging portions 32, 34 in the first embodiment. As illustrated in FIG. 13, the engaging portion 132 has a metal leaf spring 172 and a resin cover 174. The leaf spring 172 has a shape similar to that of the leaf spring 60 in the first embodiment. As illustrated in FIGS. 17A and 17B, the leaf spring 172 has a generally U-shape and includes a pair of opposed portions 180, 180 and a connector 182. The pair of opposed portions 180, 180 are connected to each other at their one ends by the connector 182 and not connected to each other at the other ends which are respectively provided with a pair of flanges 184, 184. The pair of flanges 184, 184 respectively includes a pair of intermediate flanges 185m, 185m and two pairs of end flanges 186e, 186e. Specifically, each of the flanges 184, 184 includes: the intermediate flange 185m at its intermediate portion; and the two end flanges 186e located on opposite sides of the intermediate flange 185m. The cover 174 has a shape similar to that of the cover 62 in the first embodiment. The engaging portion 132 is inserted and fitted in the through hole 114.

Rib

Figure 16:
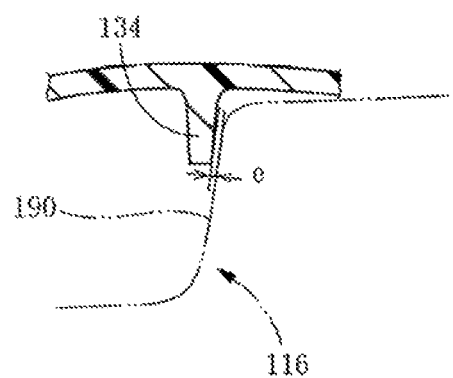
FIG. 16 is a cross-sectional view taken along line XVI-XVI in FIG. 12.

As illustrated in FIG. 16, the steps 116 of the wheel 102 and the respective ribs 134, 135 of the cap 100 are opposed to each other, with a clearance e therebetween. As in the first embodiment, when a force of the cap 100 in the radial direction becomes greater than or equal to the set value Fth, and the cap 100 is moved outward, the clearance e disappears, and the ribs 134, 135 (noted that FIG. 16 illustrates only the rib 134) are brought into contact with radially-inward facing surfaces 190 of the respective steps 116. As a result, the force in the radial direction is received by the ribs 134, 135, making it possible to reduce the force acting on the engaging portion 132 in the radial direction.

The caps 100 according to the second embodiment can also be easily installed on the wheel 102 without using, e.g., jigs. Each cap 100 is positioned with respect to the wheel 102 in the radial direction by the engaging portion 153 and the engaging portion 132 and positioned with respect to the wheel 102 in the circumferential direction by the pair of engaging portions 154, 155, enabling automatic centering. The ribs 134, 135 can reduce the force acting on the engaging portion 132 in the radial direction, resulting in improved durability of the engaging portion 132.

In the present embodiment, each of the engaging portions 153, 132 is one example of a radially positioning engaging portion, and each of the engaging portions 154, 155 is one example of a circumferentially positioning engaging portion. Also, one of the leaf springs 151, 152 is one example of a first side-wall spring member, and the other is one example of a second side-mil spring member. The leaf spring 150 is another example of the step spring member, and the leaf spring 172 is another example of the hole spring member.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

What is claimed is:

1. A cap, comprising:
   a plurality of engaging portions elastically engageable with a wheel for holding a tire,
   wherein the cap is configured to partly cover the wheel,
   wherein each of the plurality of engaging portions comprises a spring member formed of metal,
   wherein at least two engaging portions of the plurality of engaging portions are spaced apart from each other in a radial direction of the wheel in a state in which the cap is installed on the wheel,
   wherein the cap comprises at least one contact portion,
   wherein when a radially outward force of the wheel which acts on the cap is less than a set value, the at least one contact portion faces a radially facing surface of the wheel in the radial direction and is spaced apart from the radially facing surface, and
   wherein when the radially outward force is greater than or equal to the set value, the at least one contact portion is in contact with the radially facing surface.

2. The cap according to claim 1, wherein at least two of the plurality of engaging portions are spaced apart from each other in at least one of a circumferential direction and a radial direction of the wheel in a state in which the cap is installed on the wheel.

3. The cap according to claim 1,
   wherein a clearance is formed between the contact portion and the radially facing surface in the radial direction in the state in which the cap is installed on the wheel, and
   wherein a size of the clearance and an elastic modulus of each of the at least two engaging portions are determined such that the contact portion is in contact with the radially facing surface when the radially outward force greater than or equal to the set value acts on the cap.

4. The cap according to claim 1, wherein each of at least one engaging portion of the plurality of engaging portions comprises at least one hole spring member, each of which is the spring member shaped so as to be engageable with a through hole formed in the wheel.

5. The cap according to claim 4,
   wherein each of the at least one hole spring member comprises: a spring body having a substantially U-shape; and a pair of flanges respectively provided on opening-side opposite end portions of the spring body, and
   wherein each of the at least one engaging portion comprises a resin cover that covers at least a portion of a corresponding one of the at least one hole spring member.

6. The cap according to claim 1, wherein each of at least one of the plurality of engaging portions comprises at least one step spring member, each of which is the spring member shaped so as to be engageable with a step of the wheel.

7. The cap according to claim 6, wherein each of the at least one step spring member comprises at least one hook each engageable with the step of the wheel.

8. The cap according to claim 1,
   wherein two engaging portions of the plurality of engaging portions are spaced apart from each other in a circumferential direction of the cap,
   wherein one of the two engaging portions comprises a first side-wall spring member which is the spring member elastically engageable with one of a pair of side walls of a recessed portion of the wheel, and the pair of side walls face each other in the circumferential direction, and
   wherein another of the two engaging portions comprises a second side-wall spring member which is the spring member elastically engageable with another of the pair of side walls.

9. The cap according to claim 8,
   wherein the first side-wall spring member and the second side-wall spring member are curved and respectively comprise openings, and
   wherein the first side-wall spring member and the second side-wall spring member are provided in a state in which the openings thereof are opposed to each other.

10. The cap according to claim 1,
wherein the cap has a substantially fan shape, and
wherein the plurality of engaging portions comprise:
- an inner-circumferential-side engaging portion that is one of the plurality of engaging portions which is provided on an inner side of the cap in a radial direction of the wheel in a state in which the cap is installed on the wheel; and
- two outer-circumferential-side engaging portions that are two of the plurality of engaging portions, the two outer-circumferential-side engaging portions being provided on an outer side of the inner-circumferential-side engaging portion in the radial direction and spaced apart from each other in a circumferential direction of the wheel.

11. The cap according to claim 1,
wherein the cap extends substantially in a longitudinal direction of the cap, and
wherein the plurality of engaging portions comprise:
- two circumferentially positioning engaging portions that are two of the plurality of engaging portions, the two circumferentially positioning engaging portions being spaced apart from each other in a circumferential direction of the wheel;
- two radially positioning engaging portions that are two of the plurality of engaging portions, the two radially positioning engaging portions being different from the two circumferentially positioning engaging portions and spaced apart from each other in a radial direction of the wheel in a state in which the cap is installed on the wheel.

* * * * *